(12) United States Patent
Alvez

(10) Patent No.: US 8,272,118 B2
(45) Date of Patent: Sep. 25, 2012

(54) METHOD OF PREPARING THE CONNECTION BETWEEN TWO FUSELAGE SECTIONS OF AN AIRCRAFT

(75) Inventor: Pierre Alvez, Caussade (FR)

(73) Assignee: Airbus Operations SAS, Hamburg (DE)

(*) Notice: Subject to any disclaimer, the term of this patent is extended or adjusted under 35 U.S.C. 154(b) by 0 days.

(21) Appl. No.: 12/789,308

(22) Filed: May 27, 2010

(65) Prior Publication Data
US 2011/0056066 A1 Mar. 10, 2011

Related U.S. Application Data

(63) Continuation of application No. PCT/EP2007/063032, filed on Nov. 29, 2007.

(51) Int. Cl.
*B23P 17/00* (2006.01)
*B23Q 3/00* (2006.01)

(52) U.S. Cl. ........................ 29/525.06; 29/464

(58) Field of Classification Search .......... 29/464, 29/525.06, 527.1, 463, 465, 466, 467, 468, 29/26 A, 34 B, 715, 716, 721, 243.53, 281.1; 408/3
See application file for complete search history.

(56) References Cited

U.S. PATENT DOCUMENTS

| | | | |
|---|---|---|---|
| 2,830,475 A | 4/1958 | Jones | |
| 4,749,930 A | 6/1988 | Faville et al. | |
| 6,237,210 B1 | 5/2001 | Stoewer et al. | |
| 6,612,791 B1 * | 9/2003 | Haimer | ............... 409/232 |
| 6,892,160 B2 | 5/2005 | Gooch et al. | |
| 7,756,321 B2 | 7/2010 | Marsh et al. | |
| 7,966,729 B2 | 6/2011 | Frauen et al. | |
| 2007/0152012 A1 | 7/2007 | Day et al. | |

FOREIGN PATENT DOCUMENTS

| | | |
|---|---|---|
| DE | 19834703 C1 | 12/1999 |
| JP | 5016888 A | 1/1993 |
| JP | 2006051557 A | 2/2006 |
| RU | 2084379 C1 | 7/1997 |
| RU | 2121452 C1 | 11/1998 |
| SU | 1655071 A1 | 10/1995 |
| SU | 1824828 A1 | 6/1996 |

OTHER PUBLICATIONS

International Search Report for PCT/EP2007/063032 mailed Aug. 27, 2008.
Russian Patent Office, Russian Notice of Allowance dated Nov. 25, 2011 for Russian Patent Application No. 2010123345/02(033181).
Japanese Patent Office, Japanese Notice of Reasons for Rejection dated Jul. 10, 2012 for Japanese Patent Application No. 2010-535245.

* cited by examiner

*Primary Examiner* — John C Hong
(74) *Attorney, Agent, or Firm* — Ingrassia Fisher & Lorenz P.C.

(57) ABSTRACT

A method is provided for connecting two fuselage sections. A less complicated and time consuming method was found by using High-Speed-Drilling (HSD) for a group of final bore holes through the outer skin of at least one fuselage section and/or the coupling using one drilling template preferably without any pilot drilling.

8 Claims, 1 Drawing Sheet

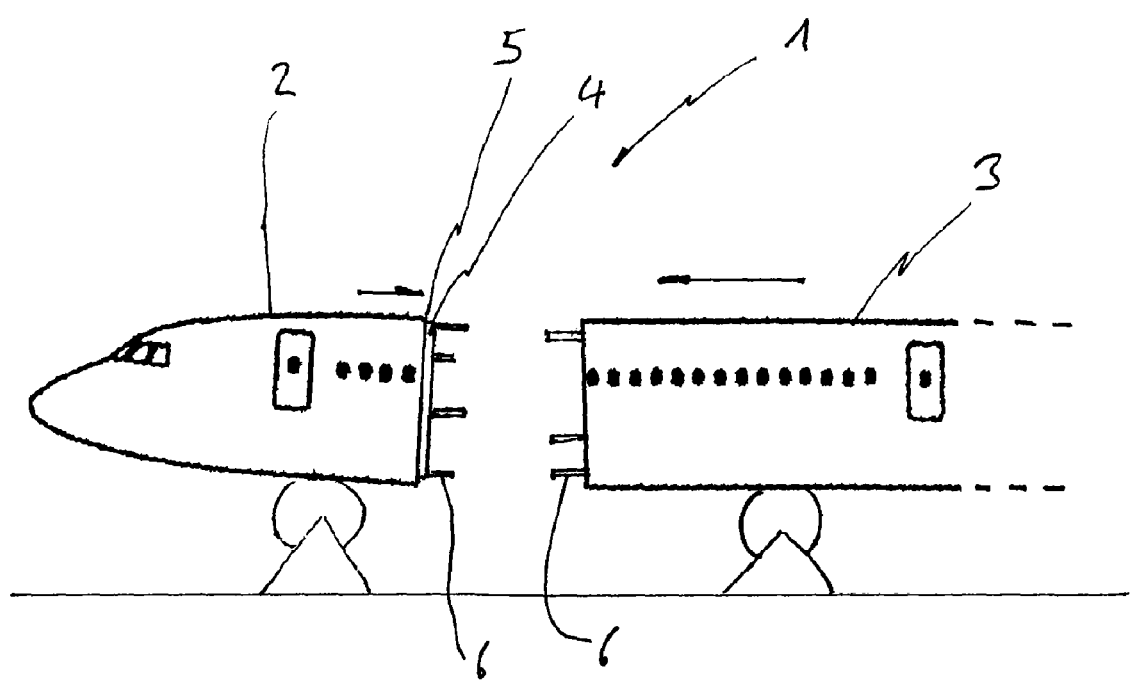

METHOD OF PREPARING THE CONNECTION BETWEEN TWO FUSELAGE SECTIONS OF AN AIRCRAFT

CROSS-REFERENCE TO RELATED APPLICATIONS

This is a continuation of International Application No. PCT/EP2007/063032, filed Nov. 29, 2007, which is hereby incorporated by reference in its entirety.

TECHNICAL FIELD

The present invention relates to a method of preparing the connection of two fuselage sections, which are also referred to as barrels, of an aircraft.

BACKGROUND

The manufacturing process of a commercial aircraft comprises the preparing the connection of the fuselage sections. The preparing of the connection and the connection itself is known as complicated and time-consuming, because the connection has to be exact and robust. Particularly with regard to the length of the fuselage, small tolerances of a few millimeters may lead to enormous tolerances of some centimeters at the end portion of the fuselage and causes the fly characteristic of the airplane in an unknown way.

Exemplary a short description should be given about the today's method of preparing the connection of two fuselage sections of an aircraft. The sections with pre-mounted seat bars and stringers are jacked up and moved towards each other and arranged accurately using means, as for instance the seat bars or stringers and/or the width of the slit between the leading edges of the sections (circular slit with a few millimeter constant distance), till the center lines of the barrels, namely the longitudinal axis of the fuselage are in line. Small bars are clamped at the stringers to act as coupling means and to compensate the aforesaid tolerances.

At first the stringers themselves are not fixed between the last circular frame and the front edge of one section. Therefore a further compensation of the tolerances is possible. Furthermore, to compensate the manufacturing tolerances of one section it possesses a lengthwise slit. Circular brackets with calibrated bore holes (CBH) are attached at the inner side of the barrel and overlapped the front edge of one barrel by plugging fixing means as temporary rivets. The radius of the brackets is the same as the associated part of the section.

Beside the other fittings as the aforesaid small bars, the circular brackets may be attached via further fixing elements such as temporary rivets to the other barrel and a drilling template together using tack riveting.

The next process step is to drill pilot holes for every planned final bore hole which is in fact every bore hole through the skin of the sections and the brackets. Because material, such as drilling chips, could penetrate the possible spacing between the relatively thin skin and the circular bracket, it is necessary to disassemble the barrels and the fittings. After drilling the pilot holes into the skin and the circular brackets the boreholes may be deburred and degreased.

In view of the foregoing, it is at least one object of the invention to provide a less complicated and time consuming method of preparing the connection of two fuselage sections (i.e., barrels) of an aircraft. In addition, other objects, desirable features, and characteristics will become apparent from the subsequent summary and detailed description, and the appended claims, taken in conjunction with the accompanying drawings and this background.

SUMMARY

At least one benefit of the embodiments of invention is that no bore holes especially at the brackets of the fuselage sections have to be pilot drilled. High-Speed-Drilling allows a drilling in a single step. The force which acts downwards to the section or the bracket is significantly lower than during standard drilling processes which are known in this technical field. Therefore, deformation of the sections/brackets can be avoided.

The method includes, but is not limited to High-Speed-Drilling (HSD) of a group of final bore holes through an outer skin of at least one fuselage section or a coupling using one drilling template.

BRIEF DESCRIPTION OF THE DRAWING

The present invention will hereinafter be described in conjunction with the following drawing FIGURE of a schematic side view of a part of a fuselage with a first fuselage section in front and a second fuselage section used in describing the embodiments of the invention, which is not full scaled.

DETAILED DESCRIPTION

The following detailed description is merely exemplary in nature and is not intended to limit application and uses. Furthermore, there is no intention to be bound by any theory presented in the preceding background or summary or the following detailed description.

According to a first exemplary embodiment, a method is provided for preparing the connections of two fuselage sections. The method may be comprise one or all of the following steps, preferably, but not necessarily, in the following order: arranging of the sections each with one section opening towards the other section and attaching of coupling means such as brackets which contains calibrated bore holes (CBA) to at least one fuselage section and/or stringer element of at least one section. "Attaching" comprises calibrating the sections in a longitudinal axis and/or in a vertical axis of the aircraft. Detaching the fuselage sections from the coupling means and degreasing and/or deburring of the fuselage sections. Applying of sealing compound to the sections, particularly the coupling means. Fixing/riveting of the fuselage sections and the coupling means such as in a pilot drill position. Fixing of at least one drilling template via fixing means and calibrated bore holes at the fuselage sections and/or coupling means using the CBA. Drilling of a group of pilot bore holes (4.6 mm) through the outer skin of at least one barrel by using the CBA as guiding bore holes, and High-Speed-Drilling (HSD) of a group of final bore holes (4.8 mm) through the outer skin of at least one fuselage section and/or the coupling means using one drilling template. The HSD reached approximately 15,000 to approximately 20,000 revolutions per minute (RPM) and the HSD contains the lubrication and the countersinking of the bore holes. Generally pilot drilling is not necessary if the High-Speed-Drilling is used in the method.

The FIGURE shows a schematic side view of a part of a fuselage 1 with a first fuselage section 2 in front and a second fuselage section 3. A first coupling means, in the form of a circular bracket 4 (e.g., frame) as an example, is fixed at the leading edge 5 of section 2. Not shown are the final and pilot bore holes in the aforesaid means/sections. Both sections 2, 3 contain further coupling means in form of stringers 6.

It should be noted that the term "comprising" does not exclude other elements or steps and "a" or "an" does not exclude a plurality. Also elements described in association with different embodiments may be combined. It should be noted that reference signs in the claims shall not be construed as limiting the scope of the claims. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method of preparing a connection of a first fuselage section and a second fuselage section of an aircraft, the first fuselage section and the second fuselage section comprising an outer skin, the method comprising the steps of:
    arranging a first section opening of the first fuselage section with a second section opening of the second fuselage section;
    attaching a coupling that contains calibrated bore holes to at least one of the first fuselage section, the second fuselage section, or a stringer element of at least one of the first fuselage section or the second fuselage section;
    fixing of at least one drilling template via a fixing means and the calibrated bore holes to at least one of the first fuselage section, the second fuselage section, or the coupling using the calibrated bore holes; and
    without the use of pilot holes, drilling of a group of final bore holes through the outer skin of at least one of the first fuselage section, the second fuselage section, or a coupling using the at least one drilling template, the drilling being accomplished at a drilling speed ranging between approximately 15,000 to approximately 20,000 revolutions per minute.

2. The method according to claim 1, further comprising the steps of:
    degreasing the first fuselage section and the second fuselage section; and
    deburring the first fuselage section and the second fuselage section.

3. The method according to claim 1, further comprising the steps of:
    applying a sealing compound to the at least one of the first fuselage section and the second fuselage section;
    fixing and riveting of the first fuselage section, the second fuselage section, and the coupling.

4. The method according to claim 1, wherein the High-Speed-Drilling comprises the step of lubricating the group of final bore holes.

5. The method according to claim 1, wherein the High-Speed-Drilling comprises the step of countersinking the group of final bore holes.

6. The method according to claim 1, wherein the attaching the coupling comprises attaching the coupling that contains the calibrated bore holes to the first fuselage section and the second fuselage section.

7. The method according to claim 1, wherein the fixing of the at least one drilling template via the fixing and the calibrated bore holes comprises fixing of the at least one drilling template via the fixing and the calibrated bore holes to the first fuselage section and the second fuselage section using the calibrated bore holes.

8. The method according to claim 1, further comprising the step of applying a sealing compound to the coupling.

* * * * *